May 6, 1958 L. E. PUCHER ET AL 2,833,845
ELECTRIC BATTERY
Filed Nov. 6, 1953

INVENTORS
LEO E. PUCHER
WILLIAM A. CUNNINGHAM
BY JOSEPH E. SZABO

Hudson, Boughton,
Williams, Davidt Hoffmann
ATTORNEYS

2,833,845

ELECTRIC BATTERY

Leo E. Pucher and William A. Cunningham, South Euclid, and Joseph F. Szabo, Lakewood, Ohio, assignors to The Electric Storage Battery Company, a corporation of New Jersey Application November 6, 1953, Serial No. 390,707

3 Claims. (Cl. 136—9)

The present invention relates to batteries and, more particularly, to batteries in which the active materials of the positive and negative plates are or comprise silver peroxide and/or other higher oxides of silver and zinc, respectively.

The principal objects of the invention are the provision of a novel and improved battery and method of manufacturing the same in which the active materials of the positive and negative plates are or comprise silver oxide, peroxide and/or other so-called higher oxides of silver and highly reactive sponge zinc, respectively, and which battery will have a very high capacity per unit volume, will have a very high discharge voltage as compared to prior batteries, will have a low, self-discharge rate resulting in long shelf life, and which will be simple and rugged in construction and relatively inexpensive to manufacture.

The invention further resides in certain novel features of the construction and arrangement of the parts of the apparatus, and further objects and advantages of the invention will be apparent to those skilled in the art to which it pertains from the following description of the present preferred embodiment described with reference to the accompanying drawing, in which.

Figure 1:
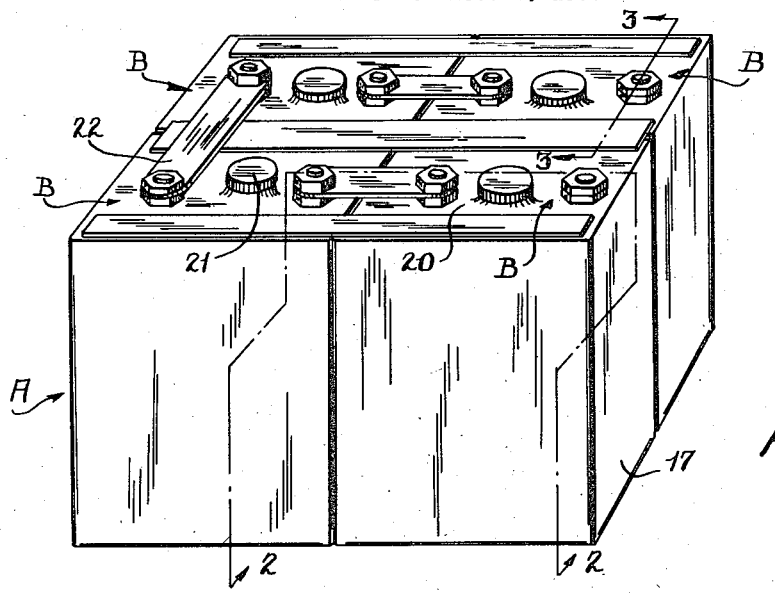
Fig. 1 is a perspective view of a battery embodying the present invention.
Figure 2:
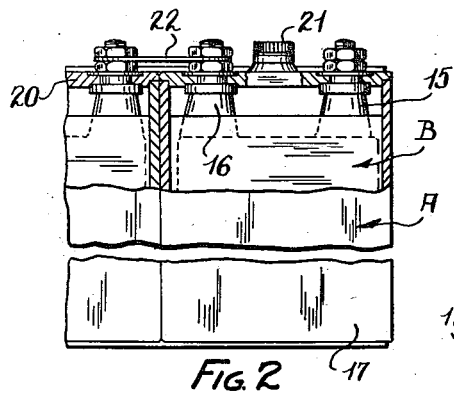
Fig. 2 is a sectional view approximately on the line 2—2 of Fig. 1.
Figures 4, 5:
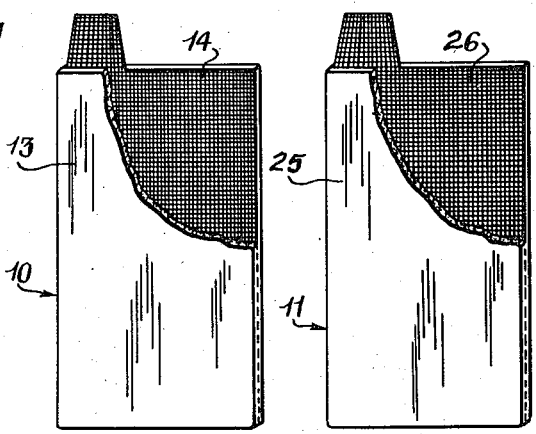
Fig. 4 is an enlarged view of one of the positive plates with portions broken away to show the construction.
Fig. 5 is an enlarged view of one of the negative plates with parts broken away to show the construction.
Figure 3:
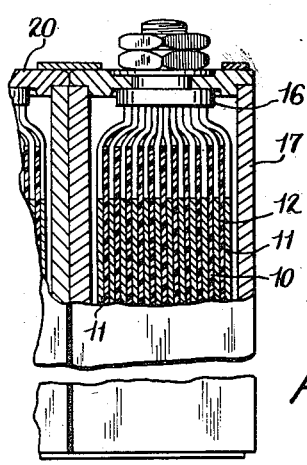
Fig. 3 is a sectional view approximately on the line 3—3 of Fig. 1.

While the present invention may be otherwise embodied, it is herein shown and described by way of illustration as embodied in a multi-cell battery A, each cell B of which there are four, as shown, comprises a plurality of positive plates 10 interposed between negative plates 11, the adjoining plates being separated from each other by separators 12.

The positive plates 10 each comprises silver oxide, peroxide and other higher oxides of silver 13 supported on or carried by a suitable supporting grid 14, preferably a silver or nickel wire gauze or screen. The negative plates 11 each comprises sponge zinc 15 supported on or carried by a suitable supporting grid 16, preferably copper, bronze or silver wire gauze or screen, covered with a hard, non-porous zinc coating produced by plating from an alkaline-cyanide bath. The zinc coating being much harder than the sponge zinc active material, thereby serves to prevent galvanic action between the grid metal and the sponge zinc of the negative plate and thus reduces self-discharge of the plate. The coating also increases the cycling life of the plates and, in turn, the batteries. The plate separators 12 may be of any suitable material, such as latex impregnated, natural cellulosic paper commercially available under the trade name "Aldex"; or non-woven fabrics, such as "Viskon," "Webril"; resin-impregnated fabric "Dynel"; glycerine-free, regenerated cellulose "Visking," "Nojax," etc. The electrolyte is preferably a 31% to 33% solution of potassium hydroxide. The batteries, however, are preferably shipped and stored dry, the electrolyte being added shortly before they are put into service.

The positive plates are preferably made by pasting the grid 14 with a paste made by mixing silver oxide powder (reagent grade) with water and a wetting agent; for example, a 0.1% water solution of Tergitol. The use of a wetting agent reduces the amount of liquid required to make a workable paste, thereby increasing the paste density and giving higher active material weight per unit volume than would otherwise be obtained. The silver oxide is then reduced to produce a metallic silver sponge by sintering the pasted plate in a furnace at about 880° F. or by drying the pasted plates and passing them through a gas flame. Prior to being sintered, the surfaces of the plates are preferably grooved. This helps to relieve stresses set up during drying and sintering and minimizes buckling, cracking, and other physical distortions of the plates during the sintering or reducing operation. The sintered plates are preferably compressed to smooth out any possible high spots and bumps, especially because of the extreme thinness of the separators or insulation employed therewith. The plates are subsequently formed in a manner hereinafter referred to.

The negative plates 11 are preferably made by pasting the grid 16 with a paste made by mixing powdered zinc oxide (reagent grade) with 30–35% potassium hydroxide solution. The paste should be kept covered and used as soon as possible after mixing so as to avoid, as well as possible, absorption of $CO_2$ from the atmosphere. After the grids are pasted the plates are air-dried at room temperature for from 2 to 6 hours depending upon their thickness. The plates are subsequently assembled for cathodical formation.

Preparatory to forming, the positive plates are placed in synthetic fiber screen bags. If, during formation, positive active material is allowed to come into direct contact with cellulosic material, such as paper, the silver oxide and peroxide will react with such material and the plates will not form properly. By placing the positive plates in synthetic fiber screen bags, such as are commercially available under the trade name "Saran," "Nylon," "Teflon," etc., direct contact between the plates and the cellulosic insulation is prevented, and satisfactory formation is obtained. The material preferably should be about 30 x 30 mesh.

For purposes of formation to silver peroxide and zinc, an equal number of pasted positive and negative plates are assembled into a battery or cell element with adjacent plates separated from one another by suitable insulators or separators. To assure complete formation of the end plates, nickel screen or gauze "dummy" plates may be included in the assembly as end-positive and end-negative plates, respectively.

The insulating material used between the plates may be one of several cloth-like, non-woven fabrics, such as that commercially available under the trade name "Plastavon" and manufactured by Avondale Mills of Birmingham, Alabama, or a special paper, such as is commercially available under the trade name "Singer Saturating Paper" and manufactured by Hollingsworth and Whitney.

After assembly of the element, the individual plate lugs consisting of portions of gauze or screen projecting above the pasted part or portion are soldered or otherwise connected together into positive and negative plate groups, respectively. These lugs extend above the element proper and are used as terminals for connecting to a direct current forming source of electricity. The element is next placed in a formation container filled with 5% potassium hydroxide solution.

The terminals of the element are connected to the direct current forming or charging circuit, and the cell is charged about 12 to 24 hours at a rate based on the total weight of silver in the element. At the end of this time the circuit is opened and the cell discharged at about 90% of the charging rate for about 1 to 1½ hours. The length or time of charge and discharge, however, depends upon the thickness and weight of the plates.

On completion of the discharge the cell is recharged for about 2 to 3 hours at the original charging rate. Voltage readings are taken periodically during charge, discharge, and recharge as a check on cell condition. A short open stand, up to about 10 minutes, is permissible between the charge, discharge and recharge cycles. A longer stand should be avoided so as to prevent discharge of the cell as a result of internal short circuits.

Following the recharge, the cell is washed for about 2 to 5 minutes with cold, running tap water. The plate lugs are separated by cutting apart and the individual plates transferred to positive and negative wash tanks, respectively. Insulation material and fiber screen bags are removed as the plates are separated from the element. Positive plates are washed for about 1 hour in cold, running tap water, blotted on paper towelling and air-dried in a circulating air chamber. Negative plates are washed for about 2 hours in cold, running tap water (but no colder than about 45° F.), then blotted and dried in the same manner as positives. The lowest washing temperature is specified at about 45° F. because below this temperature, the zinc sponge contracts sufficiently to entrap potassium hydroxide, which will eventually cause oxidation of the zinc.

The positive plates are preferably given an additional formation against nickel screen dummies. This extra formation is given in about 10% potassium hydroxide solution and at a temperature of about 110° to 120° F. Charging rate and time are based on the weight and thickness of the plates. Following the second formation the positive plates are washed about ½ hour in cold, running tap water and dried at room temperatures in circulating air. It has been found that this additional formation of the positive plates increases the capacity of the battery 30% or more.

Instead of giving the positive plates an extra formation against dummies after the formation against negative plates, it is also possible to preform them against dummies before the formation against pasted zinc oxide negatives. Alternatively the plates can be formed entirely against dummies, but experience has shown that batteries built with positives and negatives which were formed together will give two to three times the capacity of batteries whose plates were formed separately against dummies.

Formation rate and time are based on the total weight and thickness of silver in the element. There is no hard and fast rule as to the formation time as it depends upon plate thickness, type of insulation used between the plates, current density, cell temperature, etc. Actual experience, however, indicates that positive plates with an average thickness of 0.020" require from about 500 to 700 ampere-hours formation per pound of silver. A charging rate of about 0.08 to 0.12 ampere per gram of silver has been used successfully with plates of the character referred to. Thicker plates (for example 0.060" thick) require 700 to 800 ampere-hours per pound of silver for initial formation. The additional formation against dummy cathodes, referred to, is preferably about 150 to 200 ampere-hours per pound of silver. Negative plate formation is generally complete when the formation cell voltage reaches a maximum value and then either remains constant or decreases slightly. Discharge and subsequent recharge may be omitted when a high, first-cycle capacity battery is not required.

The edges of both positive and negative plates are preferably pressed heavily just prior to assembly. This flattens any jagged edges, protruding wires, or other irregularities, thereby reducing possibilities of short circuits in the finished cell. The positive plates may have a density of from about 30 to 75 grams per cubic inch. The preferred density, however, is from about 40 to 55 grams per cubic inch. Negative plates and, more particularly, overpasted or thick plates, are preferably pressed lightly over their entire surfaces to smooth out any high spots or lumps which might cause short circuits.

If the plates are overpasted and, therefore, relatively thick, a special "saturating" paper made by Hollingsworth and Whitney and sold under the trade name "Singer Paper" is preferably used for plate separators.

During sintering, the silver oxide of the positive plate is changed to sponge silver. During formation the silver of the positive plate is changed to silver oxide, peroxide and/or other high oxides of silver and the zinc oxide of the negative plate reduced to highly reactive sponge zinc.

Subsequent to formation, the plates are assembled into battery elements, if they are not already so assembled, and the positive and negative plate lugs spot-welded or otherwise connected to positive and negative terminal blocks 25, 26, respectively, and the elements placed in the respective cell compartment of the battery container, designated generally at 17, and which may be made of any suitable material. The cells are closed with suitable covers 20 having separate filling openings normally closed by vent plugs 21. The cells are connected together by intercell connectors 22. As previously stated, the batteries are preferably shipped, stored, etc. dry and the electrolyte consisting of a 31% to 33% solution of potassium hydroxide added shortly before the battery is placed in service. The batteries may be used either as primary or secondary batteries and do not have the usual high voltage hump upon initial discharge in service, a characteristic of the usual so-called "silver-zinc" cells.

From the foregoing description, it will be apparent that the objects heretofore enumerated and others have been accomplished.

While the preferred construction of the battery of the present invention and the preferred method of its manufacture has been described in considerable detail, it will be apparent to those skilled in the art to which the invention relates that changes may be made both in the construction and in the method of manufacture within the scope of the present invention and it is the intention to cover hereby all adaptations and modifications thereof within the scope of the appended claims.

Having thus described our invention, we claim:

1. The method of forming a silver zinc battery comprising applying a paste of silver oxide to a metallic grid, zinc plating a metallic grid selected from the group consisting of copper, bronze and silver, applying zinc oxide to said zinc plated grid, pressing the edges of both of said grids, forming the positive and negative plates together until the positive active material is electro-chemically converted to silver oxide and the negative active material is electro-chemically converted to metallic zinc, and subjecting said positive plate to additional formation against dummy negative plates whereby said positive active material is electro-chemically converted to silver peroxide.

2. The method of producing a silver zinc battery comprising mixing a paste of silver oxide, water and a wetting agent, applying said paste to a metallic grid, zinc plating a copper screen and applying zinc oxide thereto, pressing the edges of said grids, forming the positive and negative plates together until the positive active material is electrochemically converted to silver oxide and the negative active material is electrochemically converted to metallic zinc, then subjecting said positive plate to additional formation against dummy negative plates whereby said silver oxide is electrochemically converted to silver peroxide.

3. The method of claim 2 in which said positive plate is grooved and sintered prior to formation.

References Cited in the file of this patent

UNITED STATES PATENTS

| | | |
|---|---|---|
| 543,680 | Epstein | July 30, 1895 |
| 732,842 | Gardiner | July 7, 1903 |
| 2,561,943 | Moulton et al. | July 24, 1951 |
| 2,594,711 | Andre | Apr. 29, 1952 |
| 2,594,714 | Andre | Apr. 29, 1952 |
| 2,724,734 | Howard | Nov. 22, 1955 |
| 2,727,083 | Hollman et al. | Dec. 13, 1955 |